(12) United States Patent
Pinkerton

(10) Patent No.: US 8,839,821 B2
(45) Date of Patent: Sep. 23, 2014

(54) FLOW STRAIGHTENING APPARATUS

(75) Inventor: Robert N. Pinkerton, Hemet, CA (US)

(73) Assignee: McCrometer, Inc., Hemet, CA (US)

( * ) Notice: Subject to any disclaimer, the term of this patent is extended or adjusted under 35 U.S.C. 154(b) by 1323 days.

(21) Appl. No.: 12/600,600

(22) PCT Filed: May 9, 2008

(86) PCT No.: PCT/US2008/006090
§ 371 (c)(1),
(2), (4) Date: Apr. 20, 2010

(87) PCT Pub. No.: WO2008/143834
PCT Pub. Date: Nov. 27, 2008

(65) Prior Publication Data
US 2010/0224275 A1    Sep. 9, 2010

Related U.S. Application Data

(60) Provisional application No. 60/930,802, filed on May 18, 2007.

(51) Int. Cl.
*F15D 1/04* (2006.01)
*F15D 1/02* (2006.01)
*G01F 15/00* (2006.01)

(52) U.S. Cl.
CPC . *G01F 15/00* (2013.01); *F15D 1/02* (2013.01)
USPC .......................................................... 138/39

(58) Field of Classification Search
USPC ............................................................ 138/39
See application file for complete search history.

(56) References Cited

U.S. PATENT DOCUMENTS

| | | | | |
|---|---|---|---|---|
| 1,545,209 A | * | 7/1925 | Steckel | 137/220 |
| 3,049,009 A | | 8/1962 | McCall et al. | |
| 3,310,287 A | * | 3/1967 | Clark et al. | 415/209.2 |
| 3,693,329 A | * | 9/1972 | Willis | 55/457 |
| 3,895,930 A | * | 7/1975 | Campolong | 55/394 |
| 4,232,710 A | * | 11/1980 | Gallo et al. | 138/39 |
| 4,295,608 A | * | 10/1981 | White | 239/14.2 |
| 4,638,672 A | | 1/1987 | McCall | |
| 4,812,049 A | | 3/1989 | McCall | |
| 5,180,257 A | * | 1/1993 | Narishima et al. | 406/173 |
| 5,363,699 A | | 11/1994 | McCall | |
| 5,404,913 A | * | 4/1995 | Gilligan | 138/37 |
| 5,596,152 A | | 1/1997 | Bergervoet et al. | |
| 5,816,907 A | | 10/1998 | Crockett | |
| 6,158,412 A | * | 12/2000 | Kim | 123/306 |
| 7,347,223 B2 | * | 3/2008 | Richter | 138/37 |
| 2004/0065375 A1 | * | 4/2004 | Snider | 138/39 |

OTHER PUBLICATIONS

International Search Report mailed Aug. 20, 2008 with respect to PCT/US08/06090.

* cited by examiner

*Primary Examiner* — James Hook
(74) *Attorney, Agent, or Firm* — Greer, Burns & Crain, Ltd.

(57) ABSTRACT

An apparatus for straightening fluid flow in a conduit or pipeline, such as an irrigation pipeline, resides in an integral assembly of a conical fluid flow displacement member effective to substantially linearalize the velocity profile of fluid flowing through the pipeline and a plurality of circumferentially spaced vanes extending longitudinally and radially of the conical member and effective to mitigate swirl and eccentric velocity profiles in the flowing fluid. The conical member consists simply of a single cone that is centered in the pipeline by the vanes. A bolt extending through the wall of the pipe and threaded into a nut on a vane secures the straightener in the line.

29 Claims, 2 Drawing Sheets

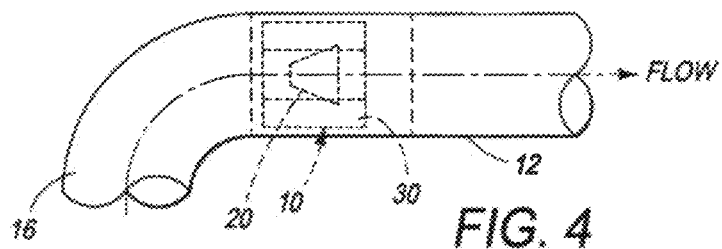
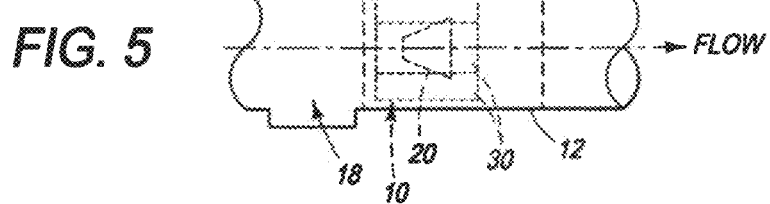
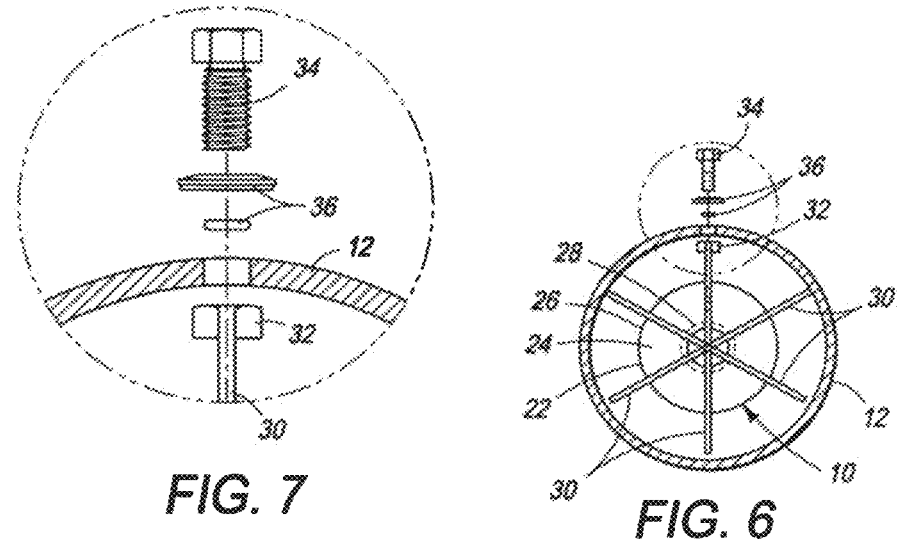

FLOW STRAIGHTENING APPARATUS

This application is a U.S. National Phase under 35 U.S.C. §371 of International Application No. PCT/US2008/006090, filed May 9, 2008, which claims priority from U.S. Provisional Patent Application No. 60/930,802, filed May 18, 2007.

FIELD OF THE INVENTION

The present invention relates to fluid flow mechanics, and more particularly, to apparatus, commonly known as flow straighteners, for converting fluid flow in a conduit from unstable and/or distorted conditions to uniform, stable and consistent flow conditions.

BACKGROUND OF THE INVENTION

For a variety of reasons, for example, accurate measurement of fluid flow through a conduit or pipeline, such as an irrigation water pipeline, it is desirable that the fluid flowing through the conduit have a substantially flat face velocity profile of maximum mean flow diameter, i.e., a diameter approaching or approximating the inner diameter of the conduit.

Frequently, departures from the optimum occur. The velocity profile maybe become convex or concave, or asymmetrical, or symmetrical but non-uniform, or the flow may develop a swirl, e.g., a helical or corkscrew flow pattern. A turn, curve or elbow in a pipeline may impart a swirl to the fluid; or a valve or impediment in the conduit through which or around which the fluid is required to flow may distort the flow and cause the flow to become irregular and unstable.

Distortions and instabilities introduced into the flow will persist for a distance equal to several pipe diameters, customarily as many as 10 to 30 pipe diameters, downstream from the cause of the disturbance. Consequently, many flow meters and systems for measuring fluid flow require a long straight run of pipe both upstream and downstream from the point of measurement to provide a reasonable degree of flow stability at the point of flow measurement.

Flow straighteners are employed to convert unstable and problematic fluid flow conditions to more stable and consistent flow conditions. Conventional flow straighteners consist of a bundle of elongate tubes, or a plurality of circumferentially spaced longitudinally extending vanes, filling the conduit adjacent or downstream from the point of disturbance.

In some instances, the flow straightener may be combined with a flow measuring system. For example, see U.S. Pat. No. 3,049,009 for a disclosure of flow straightening vanes combined with and conformed to the front face of an impeller type rotary flow meter, and U.S. Pat. No. 5,363,699 for flow stabilizing and conditioning apparatus located upstream from apparatus for determining a characteristic of the fluid flow.

The flow straightening, conditioning and stabilizing apparatus of U.S. Pat. No. 5,363,699 is predicated on and embodies the technology of the fluid flow meters disclosed in U.S. Pat. No. 4,638,672 and the fluid mixing or dispersing device disclosed in U.S. Pat. No. 4,812,049, all of which patents are owned by the assignee of the present invention. Fluid flow meters and static mixers embodying the patented device are made and sold by the assignee of this invention, McCrometer, Inc., of Hemet, Calif., under the Registered Trademark "V-CONE".

The V-CONE devices are characterized by a flow displacement member positioned coaxially within a conduit or pipe and comprised of two conical frustums facing respectively in the upstream and downstream directions and joined at their larger ends.

As described in U.S. Pat. No. 5,363,699, the V-CONE device, with and without swirl mitigating vanes, is employed for converting unstable, distorted and/or non-uniform fluid flows to optimum flow conditions, i.e., an essentially uniform, consistent and symmetrical flow pattern having a flat face velocity profile and a large and axially centered mean flow diameter.

It would be desirable to embody these advantageous characteristics into a more economical and more conveniently installed flow straightener.

SUMMARY OF THE INVENTION

It is an object of the present invention to provide improved flow straightening apparatus that achieves the advantages of the V-CONE flow straightener and that is of more economical construction and more conveniently, economically and universally adapted to resolution of problematic fluid flow conditions.

It is in particular an object of the invention to provide improved flow straightening apparatus enjoying the benefits of the flow conditioning apparatus of U.S. Pat. No. 5,363,699, and that is of simpler and more economical construction and easier to install and use.

In accordance with the present invention, an improved flow straightener is comprised of an integral assembly of a flow conditioning cone and swirl mitigating vanes. The assembly may be made of metal, made of both metal and plastic, or molded in one piece from plastic.

The flow conditioning cone consists simply of a single conical element, rather than two frusto conical elements as employed in the V-CONE devices. The single cone maybe solid or hollow, preferably hollow and open at both ends.

The swirl mitigating vanes may project upstream or downstream or both upstream and downstream from the cone. Preferably, the vanes are continuous and extend from upstream of the cone, over the surface of the cone and downstream from the cone. The vanes extend radially to the inner surface of the wall of the pipe or conduit and have an overall diametric dimension substantially equal to or slightly less than the inner diameter of the pipe or conduit. The vanes thereby serve to mount and center the cone axially within the pipe.

The flow straightener of the invention may be inserted into a pipeline during construction of the pipeline or when replacing or servicing a valve or measuring device installed in the line, or by inserting the same through a hole in the wall of the pipeline at anytime the line is not in service. The flow straightener may include but does not require a separate conduit section for its installation and may simply be inserted into an existing pipeline. Following insertion into the pipeline, the straightener is adapted to be secured in position by a simple fastening system provided pursuant to the invention. In a preferred embodiment, the straightener is secured within the conduit or pipeline simply by inserting one or more bolts through holes in the wall of the conduit and threading the same into a nut fixed on the peripheral edge of one or more of the vanes.

The straightener may be installed in a pipeline or conduit upstream of a flow measuring device and/or downstream from a flow disturbing pipeline component, such as a valve, elbow or curve. Wherever installed, the straightener of the invention is effective for stabilizing fluid flow and resolving eccentric velocity profiles. More particularly, the straightener is effective to produce a downstream flow profile that is relatively flat, symmetrical, of large mean flow diameter and axially centered in the pipe or conduit.

The flow straightener of the invention is therefore capable of resolving a variety of problematic flow conditions and is capable of doing so in a very economical, practical and facile manner.

These and other objects and advantages of the invention will become apparent to those of reasonable of skill in the art from the following detailed description, as considered in conjunction with the accompanying drawings.

BRIEF DESCRIPTION OF THE DRAWINGS

FIG. 4 is a side elevation of a pipeline or conduit containing a curve or an elbow and having the flow straightener of FIG. 1 positioned downstream from the curve or elbow;

FIG. 5 is a side elevation of a pipeline or conduit incorporating a valve, such as an irrigation check valve, and having the flow straightener of FIG. 1 positioned downstream from the valve;

FIG. 6 is a cross-sectional view of the pipeline or conduit illustrated in any of FIGS. 2, 4 and 5 taken immediately upstream of the flow straightener and showing the straightener in front elevation; and FIG. 7 is an enlarged detailed view of the portion of the pipe and flow straightener circled in FIG. 6 and illustrating in a preferred embodiment the manner in which the flow straightener of the invention is secured in place within the pipe or conduit.

DETAILED DESCRIPTION OF A PREFERRED EMBODIMENT

The following is a description of an embodiment of the invention presently contemplated by the inventor to be the best mode of carrying out his invention.

Figure 2:
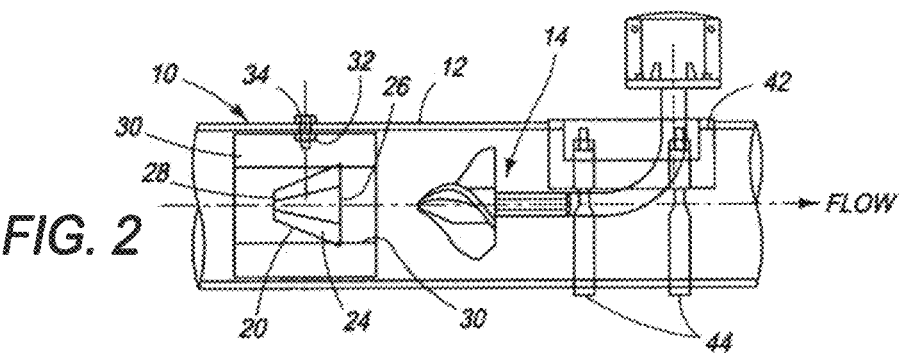
FIG. 2 is a longitudinal sectional view of a pipe or conduit containing a flow meter and having the flow straightener of FIG. 1 positioned upstream from the flow meter.

As shown in FIGS. 2, 4 and 5, the flow straightener of the invention, indicated generally at 10, is adapted to be installed in a pipe or conduit 12, notably an irrigation pipeline 12. The flow straightener 10 is especially adapted for installation upstream from a fluid flow meter 14 as shown in FIG. 2, or downstream from a curve, bend or elbow 16 in the pipeline 12, as shown in FIG. 4, or downstream from a flow disturbing pipe component such as valve 18, as shown in FIG. 5. The valve 18 may for example comprise an irrigation system check valve installed in and comprising part of an irrigation water distribution system pipeline 12.

In summary, the straightener 10 is adapted to be installed in any new or existing pipeline downstream from any disturbance causing device or upstream from any locale in which it is desired to have stable and uniform fluid flow, or anywhere else in the pipeline where needed to resolve problematic flow conditions.

Figure 1:
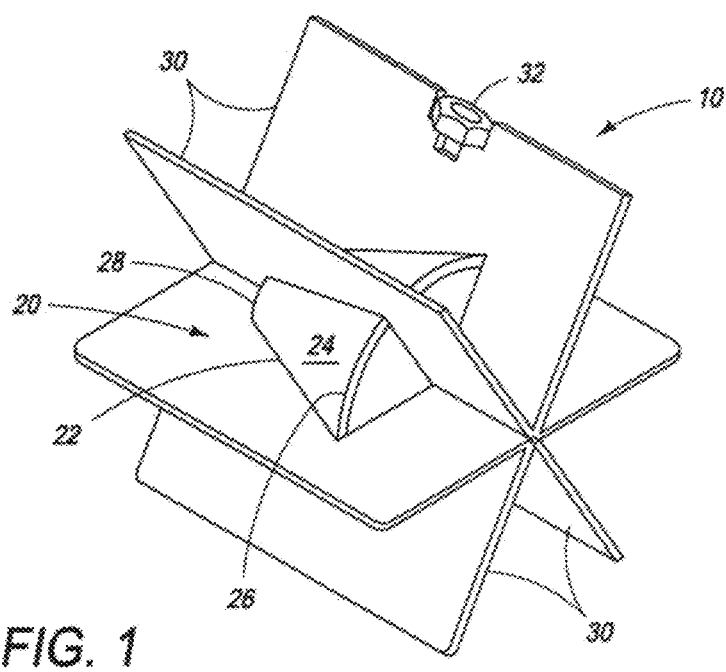
FIG. 1 is a perspective view of a preferred embodiment of the flow straightener of the invention.

The flow straightener 10 in its preferred embodiment, as shown particularly in FIGS. 1 and 6, is comprised of an integral assembly of a flow displacement member 20 and a plurality of swirl mitigating vanes 30 that are integral with and extend radially and longitudinally of the displacement member 20.

The displacement member 20 consists of a single conical element 22, preferably a frustum of a cone, herein called a cone. The cone 22 is of a size smaller than the conduit 12 and is mounted coaxially within the conduit, with its external surfaces spaced symmetrically inwardly from the interior wall of the pipe or conduit 12. The cone has a sloped surface 24 facing in the upstream direction that slopes symmetrically outward from adjacent the axis of the conduit to a downstream peripheral and terminal edge 26 spaced inwardly from the wall of the conduit.

The cone 22 maybe solid or hollow, and if hollow, maybe open or closed at its upstream or forward end 28.

The displacement member 20 is effective to deflect the fluid flowing through conduit 12 and to cause the fluid to flow through an annular region of progressively decreasing area until the flow is released for return to full flow condition at the downstream peripheral edge 26. This pattern of flow is effective to substantially linearize the velocity profile of the fluid over a range of flow rates. Fluid flow is stabilized both upstream and downstream from the cone. More particularly, the flow profile downstream from the cone will be relatively flat, symmetrical and be axially centered within the pipe or conduit. The downstream fluid profile also has a large mean flow diameter that remains constant and does not change with variations in the velocity of fluid flow.

The displacement member 20 is also effective to homogenize the fluid stream, whether liquid, gaseous or with entrained solids, i.e., to mix and render essentially homogenous a mixture of two or more fluids and/or a fluid with entrained solids. Thus the flow mixture will be essentially homogeneous throughout the downstream fluid flow profile. This is particularly advantageous for measuring flow rate and/or determining a characteristic of the fluid flowing through the pipeline 12.

The vanes 30 assist the cone 22 in producing a uniform downstream flow profile. The vanes are particularly effective in mitigating swirl and eccentric velocity profiles, such as occur downstream from a swirl inducing disturbance, for example, a curve, bend or elbow 16 in the pipeline 12.

The vanes 30 maybe of any desired number, for example, 4 to 8, but preferably comprise six vanes spaced circumferentially from one another at equal angular intervals, here intervals of 60 degrees. The vanes may extend over the surface of the cone and/or forwardly from the cone and/or rearwardly from the cone, or in any combination thereof. In the preferred embodiment, the vanes extend integrally and continuously from a location upstream of the cone over the surface of the cone and to a location downstream from the cone. The portions of the vanes upstream and downstream of the cone extend radially from the axis of the cone for a distance equal to or slightly less than the internal radius of the pipe 12. When the vanes are of an even number, the vanes are preferably aligned in pairs and have a diametrical extent substantially equal to the inner diameter of the pipe. When the straightener is installed in the pipe, the vanes 30 serve to mount and center the cone 22 coaxially within the pipe.

The vanes 30 maybe of substantially any length required to resolve a problematic condition, but will usually have a length within the range of from about 0.5 to about 2 times the inside diameter of the pipe. In most application, and in the preferred embodiment, the vanes extend equal distances upstream and downstream from the cone and have an overall length equal to about 0.88 times the inside diameter of the pipe, i.e., 88% of the pipe I.D. The Beta ratio of the cone 22, that is, the ratio of the diameter of the peripheral edge 26 of the cone to the inner diameter of the pipe 12, may be within the range of from about 0.45 to about 0.88, and for most applications is preferably about 0.82. The slope angle of the wall 24 relative to the plane defined by the peripheral edge 26 of the cone is preferably within the range of from about 39° to about 75°, most preferably about 67.5°.

As illustrated in FIGS. 2, 4 and 5, the flow straightener 10 comprised of the integral assembly of the cone 22 and vanes 30 may be installed at any desired or required location in a pipeline. The radially outer extremities of the vanes 30 are juxtaposed to the interior wall of the pipe and center the cone 22 axially within the pipe. During installation in a pipe, the straightener is slideably and rotatably supported by the vanes to accommodate positioning the straightener in the desired location.

To secure the straightener fixedly within the pipe at the desired location, the present invention provides a novel and convenient fastening system illustrated in detail in FIGS. 6 and 7. As shown, a fastener element 32, preferably an internally threaded nut, is secured within a cutout in the peripheral edge of at least one of the vanes 30 with its axis aligned radially with the vane. The straightener is slideable and rotatable within the pipe to align the nut 32 with a hole drilled through the wall of the pipe. A mating fastener element 34, here a threaded bolt, is then passed through the hole and threaded into the nut 32 thereby to secure the straightener in fixed position within the pipe. One or more conventional pipe sealing members 36 are provided between the head of the bolt and the exterior wall of the pipe.

Figure 3:
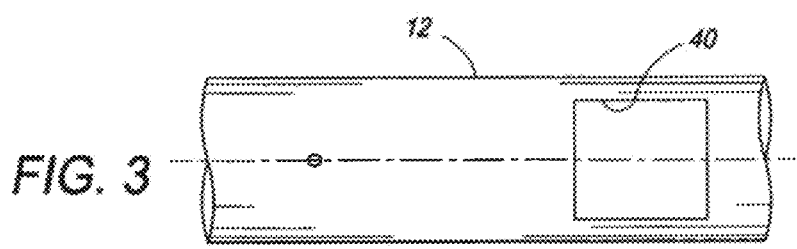
FIG. 3 is a plan view of the pipe or conduit illustrated in FIG. 2 prior to the installation therein of the flow straightener and flow meter.

Referring to FIGS. 2, 4 and 5 the flow straightener 10 is adapted to be installed at a selected position in a pipeline during construction of the line or when the line is disassembled for the specific purpose or for other reasons. Alternatively, the straightener maybe installed in an existing pipeline without disassembly of the line anytime the line is temporarily shutdown or not in use. Specifically, as illustrated in FIGS. 2 and 3, a hole 40 may be cut through the wall of the pipe, whereafter the straightener 10 may be inserted through the hole 40 into the pipe, moved to the desired location and secured in place by bolt 34 threaded into nut 32. The hole 40 may then be closed by a conventional saddle 42 sealed and secured to the pipe by saddle bolts 44. As a further alternative, the saddle 42 maybe secured to and comprise part of a fluid flow meter 14 also inserted into the pipeline 12 through the hole 40.

In another embodiment of the invention, the flow straightener 10 and flow meter 14 maybe mounted within a short section of pipe or conduit of the same diameter as the pipeline 12 and of a length adequate to house the straightener and the meter, such for example as illustrated in FIG. 2. This section of pipe including the striaghtener 10 and meter 14 can then be inserted at an appropriate location in the pipeline 12 in manners known in the art. This is a particularly advantageous flowmeter assembly requiring minimal space for installation.

The flow straightener 10 of the invention is of small size and of economical construction. Yet, it is highly effective in resolving problematic flow conditions. Specifically, the straightener is effective to convert an undesirable flow pattern to a desirable flow profile within a distance, as measured from the upstream face of the straightener, of as little as one and one-half times the inner diameter of the pipeline within which the straightener is installed. Thus, as illustrated in FIG. 2, the upstream end of the straightener need be located no more than about one and a one-half pipe diameters upstream from the impeller 15 of the flowmeter 14.

The objects and advantages of the invention have thus been shown to be achieved in a convenient, economical, practical and facile manner.

While a preferred embodiment of the flow straightener of the invention has been herein illustrated and described, it is to be appreciated that various changes, rearrangement and modifications maybe made therein without departing from the scope of the invention as defined by the appended claims.

What is claimed is:

1. A flow straightener mounted coaxially in a conduit to substantially linearize the velocity profile of fluid flowing through the conduit, the flow straightener comprising:
    a flow displacement member including a single cone having a sloped, peripheral surface; and
    a plurality of vanes non-rotatably attached to said flow displacement member, said vanes extending laterally from and being equiangularly-spaced on said peripheral surface and having ends spaced from the conduit; and
    a connector removably attached to at least one of said vanes to respectively connect and disconnect said flow displacement member to and from the conduit.

2. The flow straightener of claim 1, wherein said vanes extend an equal distance upstream and downstream from said cone.

3. The flow straightener of claim 1, wherein at least some of said vanes are aligned radially with one another and form a vane extending diametrically across the interior of the pipeline.

4. The flow straightener of claim 1, wherein said vanes are of length from about 0.5 to about 2.0 times the inner diameter of the conduit.

5. The flow straightener of claim 1, wherein said vanes are of a length equal to about 0.88 times the inner diameter of the conduit.

6. The flow straightener of claim 1, wherein a Beta ratio of said cone is from about 0.45 to about 0.88.

7. The flow straightener of claim 1, wherein a Beta ratio of said cone is from about 0.45 to about 0.88 and said vanes have a length from about 0.55 to about 2.0 times the inner diameter of the conduit.

8. The flow straightener of claim 1, said cone including a peripheral edge, wherein the slope of said peripheral surface is from about 39° to about 75° to the plane defined by said peripheral edge of said cone.

9. The flow straightener of claim 1, wherein said cone comprises a hollow frustum of a cone open at its upstream and downstream ends.

10. A flow straightener for use in a pipeline having a fluid flow path for conveying fluid therethrough in a given direction, the flow straightener comprising:
    a fluid displacement member;
    a plurality of swirl mitigating vanes,
    said displacement member consisting essentially of a single cone for installation coaxially within the pipeline,
    said cone having a sloped wall facing in the upstream direction and having a peripheral edge at its downstream end spaced inwardly from the wall of the pipeline,
    said cone being effective to substantially linearize the velocity profile of the fluid flowing through the pipeline and to stabilize fluid flow proximate the displacement member,
    said vanes extending longitudinally and radially of said cone,
    said vanes being circumferentially spaced from one another and extending radially substantially to the radius of the interior of the pipeline, said vanes being adjacent to and spaced from the wall of the pipeline for positioning said cone coaxially within the pipeline and being effective to mitigate swirl and eccentric velocity profiles in the fluid flowing through the pipeline, and a connector removably secured to at least one of said vanes to connect and disconnect the fluid displacement member within the pipeline.

11. The flow straightener of claim 10, wherein said vanes extend continuously from a location upstream from said cone, over the surface of said sloped wall and to a location downstream from said cone.

12. The flow straightener of claim 10, wherein at least some of said vanes are aligned radially with one another and form a vane extending diametrically of the interior of the pipeline.

13. The flow straightener of claim 10, wherein said vanes are of an even number, spaced circumferentially and equally from one another and aligned in pairs extending diametrically of the interior of the pipeline.

14. The flow straightener of claim 10, wherein the number of said vanes is from 4 to 8.

15. The flow straightener of claim 10, wherein the number of said vanes is 4, 6 or 8.

16. The flow straightener of claim 10, wherein said vanes are of length from about 0.5 to about 2.0 times the inner diameter of the pipeline.

17. The flow straightener of claim 10, wherein said vanes are of a length equal to about 0.88 times the inner diameter of the pipeline.

18. The flow straightener of claim 10, wherein a Beta ratio of said cone is from about 0.45 to about 0.88.

19. The flow straightener of claim 10, wherein a Beta ratio of said cone is from about 0.45 to about 0.88 and the length of the vanes is from about 0.55 to about 2.0 times the inner diameter of the pipeline.

20. The flow straightener of claim 10, wherein a Beta ratio of said cone is about 0.82 and said vanes are six in number, aligned in respective pairs diametrically of the interior of the pipeline and are of a length equal to about 0.88 times the inner diameter of the pipeline.

21. The flow straightener of claim 10, wherein the slope of the sloped wall is from about 39° to about 75° to the plane defined by the peripheral edge of said cone.

22. The flow straightener of claim 10, wherein a Beta ratio of said cone is about 0.82, the slope of the sloped wall is about 67.5° to the plane defined by said peripheral edge of said cone and the vanes are six in number, aligned in respective pairs diametrically of the interior of the pipeline, extend upstream, downstream and continuously over the surface of said cone and are of a length equal to about 0.88 times the inner diameter of the pipeline.

23. The flow straightener of claim 10, wherein said cone is hollow.

24. The flow straightener of claim 10, wherein said cone comprises a hollow frustum of a cone open at its upstream and downstream ends.

25. An apparatus for straightening fluid flow in a pipeline having a fluid flow path for conveying fluid therethrough in a given direction comprising:

a unitary assembly of a fluid flow displacement member;
a plurality of fluid flow swirl mitigating vanes,
said displacement member consisting essentially of a single cone for installation coaxially within the pipeline,
said cone having a sloped wall facing in the upstream direction spaced symmetrically inwardly from the wall of the pipeline, the sloped wall terminating at its downstream end in a peripheral edge spaced symmetrically inwardly from the wall of the pipeline,
said cone being effective to substantially linearalize the velocity profile of the fluid flowing through the pipeline and to stabilize fluid flow upstream and downstream of said cone,
said vanes being integral with said cone and extending longitudinally and radially of said cone,
said vanes being circumferentially and equally spaced from one another and extending radially substantially to but spaced from an inner surface of the pipeline,
said vanes being rotatably and slideably engagable with the interior of the pipeline for accommodating positioning of said cone at a selected location coaxially within the pipeline,
said vanes being effective to mitigate swirl and eccentric velocity profiles in the fluid flowing through the pipeline, and
means extendable through the wall of the pipeline and removably engagable with one or more of said vanes for securing the straightener within the pipeline.

26. The apparatus of claim 25, wherein said securing means comprises a first fastener element on the peripheral edge of a vane and a second cooperable fastener element extendable through the wall of the pipeline and engageable with said first fastener element.

27. The apparatus of claim 26, wherein said first fastener element comprises a nut and said second fastener element comprises a mating bolt.

28. The apparatus of claim 25, wherein said cone comprises a hollow frustum of a cone open at its upstream and downstream ends.

29. The apparatus of claim 25, wherein a Beta ratio of said cone is about 0.82, the slope of said sloped wall is about 67.5° to the plane defined by said peripheral edge of said cone and the vanes are six in number, aligned in respective pairs diametrically of the interior of the pipeline, extend upstream, downstream and continuously over the surface of said cone and are of a length equal to about 0.88 times the inner diameter of the pipeline.

* * * * *